United States Patent [19]
Dhami

[11] 3,970,770
[45] July 20, 1976

[54] WIRE COATED WITH FLUOROCARBON POLYMERS CROSS-LINKED WITH DIALYL ESTER OF 4,4'-DICARBOXYDIPHENYL ESTER

[75] Inventor: Kewal Singh Dhami, Shrewsbury, Mass.

[73] Assignee: International Telephone and Telegraph Corporation, New York, N.Y.

[22] Filed: Nov. 29, 1974

[21] Appl. No.: 528,020

[52] U.S. Cl. .............................. 428/379; 260/878 R; 260/884; 428/375
[51] Int. Cl.² .................... B32B 15/00; C08L 53/00
[58] Field of Search ........... 428/375, 379, 383, 461, 428/463, 522, 523; 260/878 R, 884, 78.4 UA, 78.4 A, 78.4 B, 87.5 A, 87.5 B, 80.77, 92.1

[56] References Cited
UNITED STATES PATENTS

| | | | |
|---|---|---|---|
| 3,580,829 | 5/1971 | Lanza | 260/884 X |
| 3,607,827 | 9/1971 | Dukert et al. | 260/884 X |
| 3,763,222 | 10/1973 | Aronoff et al. | 260/78.5 UA X |
| 3,840,619 | 10/1974 | Aronoff et al. | 260/878 R |
| 3,894,118 | 7/1975 | Aronoff et al. | 260/884 |

OTHER PUBLICATIONS

Chemical Abstracts, vol. 75, Abstract No. 21778y, 1971.

*Primary Examiner*—Lorraine T. Kendell
*Attorney, Agent, or Firm*—J. B. Raden; H. J. Holt

[57] ABSTRACT

The diallyl ester of 4,4'-dicarboxydiphenyl ether acts as an accelerator for the crosslinking of fluorocarbon polymers. The crosslinked polymers are particularly useful as electrical insulation coatings.

1 Claim, No Drawings

3,970,770

WIRE COATED WITH FLUOROCARBON POLYMERS CROSS-LINKED WITH DIALLYL ESTER OF 4,4'-DICARBOXYDIPHENYL ESTER

This invention relates to polymeric compositions comprising fluorocarbon polymers containing an ester of diphenyl ether as a crosslinking agent and to wire coated with the crosslinked composition.

High temperature processing fluorocarbon polymers possess a combination of mechanical, dielectric and chemical properties which make them particularly useful as electrical insulation materials. In order to maximize utilization of these fluorocarbon polymers under high temperature or overload conditions, crosslinking of the fluorocarbon polymers is required.

Crosslinking of high temperature resistant fluorocarbon polymers is particularly difficult since the polymers are normally processed at temperatures which are too high for most chemical crosslinking agents. As an alternative to chemical crosslinking, irradiation crosslinking of these polymers has been tried. However, to avoid massive doses of irradiation, it is necessary to add a chemical crosslinking agent or coreactant to the fluorocarbon polymers. Among such known crosslinking coreactants are diallylic esters of phenyl indan, which are shown in U.S. Pat. No. 3,763,222 and triallyl esters of aryl polycarboxylic acids, such as those disclosed in U.S. Pat. No. 3,840,619.

I have now discovered that the addition of the diallyl ester of 4,4'-dicarboxydiphenyl ether to fluorocarbon polymers accelerates the crosslinking of fluorocarbon polymers when they are subjected to ionizing radiation activation and improves to a remarkable extent the properties, and particularly the elevated temperature properties, of the resulting crosslinked compositions. In addition, because of the plasticizing and lubricating nature of the ester of the invention, the extrusion of the polymers may be carried out at a lower temperature profile.

The ester of the invention has been disclosed as a crosslinking agent for a totally different polymer system, namely unsaturated polyesters. See Chemical Abstracts, Volume 75, Abstract No. 21778Y, 1971. A method for the ester's preparation is also disclosed in the foregoing reference. Another method of preparation of the ester is by reaction of 4,4'-dicarboxydiphenyl ether with thionyl chloride to produce the corresponding diacyl chloride. The diacyl chloride is then reacted with allyl alcohol to produce the ester. Alternatively, the ester can be prepared by other methods including direct esterification, catalyzed esterification or interchange esterification from saturated esters of the dicarboxydiphenyl ether. Additionally, the compounds can be produced from the diphenyl ether dinitrile or dialdehyde or like intermediates by known techniques.

The diallyl ester of dicarboxy diphenyl ether is particularly useful as an additive for accelerating the crosslinking of high temperature processing fluorocarbon polymers, that is polymers which are extruded, or in certain instances, molded at temperatures above 260°C. These include homopolymers and copolymers such as ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene-tetrafluoroethylene copolymers and the like.

The diallyl esters of the invention may be used alone, or in combination with other polyfunctional crosslinking additives. Among such additives useful in combination are the diallylic and dimethallylic esters of phenyl indan as shown in U.S. Pat. No. 3,763,222. A number of other polyfunctional crosslinking additives, useful in combination with the present esters, are disclosed in application Ser. No. 402,302 filed Oct. 1, 1973. Examples of the latter are diallyl brassylate, triallyl trimesate, triallyl trimellitate and triallyl isocyanurate. Others will occur to those skilled in the art.

The crosslinking compound or compounds are added in amounts sufficient to plasticize the polymer or polymer blends for processing and to impart deformation resistance upon crosslinking. This amount may range from 0.5 to 20 parts by weight per 100 parts by weight of polymer, but will normally be from 1 to 10 parts of the crosslinker per 100 parts of polymer. The polymer or polymers and crosslinking compounds are blended, processed in the melt at an elevated temperature for a period of time sufficient to melt process, but insufficient to crosslink. The formed mixture is then cooled to ambient temperature and irradiated at a dosage between, for example, about 5 and 10 megarads.

The following examples illustrate the practice of the present invention. All parts are by weight, unless otherwise indicated.

EXAMPLE 1

Five parts of diallyl 4,4'-dicarboxydiphenyl ether were blended with 100 parts of various fluorocarbon polymers. Table I shows the decrease in torque values achieved by these blends as compared with the same polymers without additive.

TABLE I

| Polymer | Additive (Parts) | Chamber Temp. (°C) | Mixing Torque (Metergrams) |
|---|---|---|---|
| E/TFE[1] | None | 288 | 850 |
| " | 5 | 288 | 750 |
| E/CTFE[2] | None | 260 | 1750 |
| " | 5 | 260 | 1650 |
| PVDF[3] | None | 288 | 1075 |
| " | 5 | 288 | 875 |

[1]Ethylene-tetrafluoroethylene copolymer.
[2]Ethylene-chlorotrifluoroethylene copolymer.
[3]Polyvinylidene fluoride homopolymer.

The torque data was obtained in a "Brabender" Sigma type mixer, using a 63 gram total charge, in each case employing the noted temperature at a shear rate of 80 r.p.m.

The reduction in torque values indicates that the polymeric compositions containing the diallyl ester can be processed at lower temperatures, for example, to provide continuous thin wall extrusions or at equivalent temperatures to provide thinner wall extrusions.

The following examples illustrate the excellent mechanical and aging properties of crosslinked polymeric compositions containing the compounds of the invention.

EXAMPLES 2 – 8

A polymeric composition was prepared by powder blending 100 grams of an ethylene-tetrafluoroethylene (E/TFE) copolymer with 5 grams of the diallyl ester of 4,4'-dicarboxydiphenyl ether and 0.5 grams of magnesium oxide. The blended mixture was compression molded at 254°C and subjected to irradiation at 10 and 20 megarad doses in 1.5 mev. electron beam accelerator to produce samples of crosslinked slabs of the polymeric composition.

Similar samples were prepared from an ethylene-chlorotrifluoroethylene (E/CTFE) copolymer and a polyvinylidene fluoride (PVDF) homopolymer, respectively, as the polymeric component. An additional sample was prepared using a blend of crosslinking agents, namely the diallyl ester of the invention plus triallyl trimesate and a small amount of antioxidant. The room temperature (about 25°C) and elevated temperature properties of the compression molded, crosslinked samples are set forth in Table II. In each case, they are compared with samples containing no crosslinking additive. In the case of the elevated temperature properties, the tensile strength and elongation tests were at 250°C for E/TFE and E/CTFE polymers, and at 200°C for PVDF. The hot modulus tests were at 275°C for E/TFE, 250°C for E/CTFE and 200°C for PVDF.

for tensile strength (psi) and elongation (%) after cooling to room temperature. The E/TFE copolymers were aged at 260°C, E/CTFE copolymers were aged at 225°C and the PVDF homopolymer at 200°C. The results are set forth in Table III.

TABLE III

| Ex. | Composition | Parts | Radiation Dose (MR) | 0 T.S. | 0 Elong. | 1 T.S. | 1 Elong. | 3 T.S. | 3 Elong. | 5 T.S. | 5 Elong. | 7 T.S. | 7 Elong. | 11 T.S. | 11 Elong. |
|---|---|---|---|---|---|---|---|---|---|---|---|---|---|---|---|
| 2 | E/TFE alone | | 20 | 4241 | 83 | — | — | 4139 | 19 | 4300 | 13 | Too Brittle to test | | Too Brittle to test | |
| | | | 40 | 4656 | 38 | — | — | 4238 | 25 | 4429 | 13 | 4380 | 6 | Too Brittle to test | |
| 3 | E/TFE | 100 | 10 | 6082 | 154 | — | — | 4915 | 125 | 4472 | 50 | 4013 | 38 | 4110 | 29 |
| | Diallyl Ester | 5 | | | | | | | | | | | | | |
| | MgO | 0.5 | 20 | 6028 | 100 | — | — | 4662 | 58 | 4352 | 38 | 4907 | 25 | 4336 | 21 |
| 4 | E/CTFE alone | | 10 | 6426 | 263 | 5972 | 229 | 5003 | 194 | 4632 | 171 | 4620 | 113 | 4143 | 58 |
| | | | 20 | 5127 | 213 | 5382 | 192 | 4958 | 167 | 4882 | 121 | 4560 | 96 | 4602 | 54 |
| 5 | E/CTFE | 100 | 10 | 5971 | 146 | 5618 | 142 | 5091 | 100 | 5073 | 79 | 4682 | 71 | 4527 | 54 |
| | Diallyl Ester | 5 | | | | | | | | | | | | | |
| | MgO | 1 | 20 | 5474 | 113 | 5321 | 113 | 4826 | 71 | 4848 | 54 | 4724 | 58 | 4710 | 50 |
| 6 | PVDF alone | | 10 | 3776 | 220 | 4108 | 417 | 3782 | 267 | 3663 | 269 | 3548 | 158 | 4024 | 329 |
| | | | 20 | 3779 | 117 | 3270 | 113 | 3466 | 118 | 3436 | 75 | 4745 | 58 | 3528 | 58 |
| 7 | PVDF | 100 | 10 | 4286 | 167 | 4660 | 313 | 4690 | 196 | 4204 | 200 | 4248 | 263 | 5623 | 225 |
| | Diallyl Ester | 5 | 20 | 4181 | 104 | 3944 | 104 | 3717 | 54 | 4014 | 63 | 3885 | 75 | 3839 | 83 |
| 8 | E/TFE | 100 | 10 | 5662 | 129 | — | — | 4304 | 83 | 3855 | 58 | 3939 | 50 | 4194 | 33 |
| | Triallyl Trimesate | 2 | | | | | | | | | | | | | |
| | Diallyl Ester | 3 | 20 | 4633 | 83 | — | — | 4382 | 108 | 4124 | 63 | 4188 | 63 | 4278 | 25 |
| | Irganox 1010 | 0.25 | | | | | | | | | | | | | |

TABLE II

| Ex. | Composition | Parts | Radiation Dose (MR) | Room Temperature Tensile Strength (psi) | Room Temperature Elongation (10"/min.) (%) | Elevated Temperature Tensile Strength (psi) | Elevated Temperature Elongation (10"/min.) (%) | Hot Modulus 50 psi |
|---|---|---|---|---|---|---|---|---|
| 2 | E/TFE alone | | 10 | 5635 | 281 | 350 | 758 | Would not support 50 psi. |
| | | | 20 | 4241 | 83 | 295 | 409 | 53 |
| | | | 40 | 4656 | 38 | 251 | 186 | |
| 3 | E/TFE | 100 | 10 | 6082 | 154 | 630 | 200 | 20 |
| | Diallyl Ester | 5 | | | | | | |
| | MgO | 0.5 | 20 | 6028 | 100 | 705 | 168 | 17 |
| 4 | E/CTFE alone | | 10 | 6426 | 263 | 18 | 680 | Would not support 50 psi. |
| | | | 20 | 5127 | 213 | 37 | 124 | 29 |
| 5 | E/CTFE | 100 | 10 | 5971 | 146 | 155 | 127 | |
| | Diallyl Ester | 5 | | | | | | |
| | MgO | 1 | 20 | 5474 | 113 | 62 | 27 | 20 |
| 6 | PVDF alone | | 10 | 3776 | 220 | 70 | 435 | 302 |
| | | | 20 | 3979 | 117 | 66 | 104 | 67 |
| 7 | PVDF | 100 | 10 | 4286 | 167 | 149 | 151 | 39 |
| | Diallyl Ester | 5 | 20 | 4181 | 104 | 149 | 198 | 23 |
| 8 | E/TFEE | 100 | 10 | 5662 | 129 | 565 | 243 | 39 |
| | Triallyl trimesate | 2 | | | | | | |
| | Diallyl Ester | 3 | 20 | 4633 | 83 | 473 | 135 | 22 |
| | Irganox 1010 | 0.25 | | | | | | |

The samples of Example 2 – 8 were aged at elevated temperatures after irradiation crosslinking and tested

EXAMPLE 9

A polymeric composition was prepared by powder blending 100 grams of an E/TFE copolymer with 5 grams of the diallyl ester of 4,4'-dicarboxphenyl ether, 0.5 grams of MgO and 0.25 grams of Irganox 1010. (Irganox 1010 is tetrakis (methylene 3-(3',5'-di-tert-butyl-4'-hydroxyphenyl) propionate) methane.) The blend in powder form was extruded through an extruder head having a head temperature of 277°C to form rods. The rods were pelletized and the pellets were extruded onto the surface of an 18 AWG bare copper wire to form a 15 mil coating.

For comparison a second wire coating was prepared in the same manner from an E/TFE copolymer containing no additive. The extrusion conditions for the two samples were as follows:

| Composition | Temperature (°C) | | | | |
|---|---|---|---|---|---|
| | 1 | 2 | 3 | Die | Head |
| E/TFE copolymer (with additive) | 254 | 271 | 282 | 329 | 357 |
| E/TFE copolymer (no additive) | 304 | 316 | 316 | 354 | 377 |

The insulated wires were then subjected to irradiation with high energy electrons by a 1.0 mev. resonant beam transformer. The resulting insulated wires with irradiation crosslinked coatings were then annealed and subsequently tested to determine their mechanical and electrical properties. The results are set forth in Table IV.

TABLE IV

| Test | Composition of Wire Coatings | | | |
|---|---|---|---|---|
| | (No additive) | | (With diallyl ester) | |
| | 10MR | 20MR | 10MR | 20MR |
| Room Temperature | | | | |
| Tensile Strength (psi) | 5229 | 5480 | 4964 | 5253 |
| Elongation (%) | 133 | 170 | 83 | 100 |
| At 250°C | | | | |
| Tensile Strength (psi) | 340 | 290 | 303 | 340 |

TABLE IV-continued

| Test | Composition of Wire Coatings | | | |
|---|---|---|---|---|
| | (No additive) | | (With diallyl ester) | |
| | 10MR | 20MR | 10MR | 20MR |
| Elongation (%) | 700 | 395 | 105 | 85 |
| Hot Modulus (275°C/50 psi) | Failed | 280 | 43 | 40 |
| High Voltage Cut-thru (at 225°C one lb. (at 225°C one lb. load on each end and 900 V(rms) | Failed | Failed | Pass | Pass |
| Sequential Heat Aging* | Failed | Failed | Pass | Pass |

*Specimen should pass 10 cycles of 6 hr. each at 260°C (mandrel diameter 0.75 in. and suspension weight of 2 lbs. on each side), after each cycle, the specimen is immersed in 5% salt solution for 5 hrs. and while immersed in salt solution should withstand the application of 3000 V(rms) at 60 cps frequency for 1 min. without rupture of the insulation.

Table IV indicates the generally improved properties obtained by inclusion of the diallyl ester. The high temperature properties — hot modulus, high voltage cut-thru and sequential heat aging — of the wire coating compositions of the invention are shown to be particularly outstanding.

I claim:
1. A wire coated with an irradiation crosslinked composition comprising a fluorocarbon polymer and the diallyl ester of 4,4'-dicarboxydiphenyl ether.

* * * * *